United States Patent
Hülder et al.

(10) Patent No.: US 7,848,344 B2
(45) Date of Patent: Dec. 7, 2010

(54) METHOD FOR TRANSMITTING SUBSCRIBER-SPECIFIC DATA

(75) Inventors: Stefan Hülder, Dorsten-Deuten (DE); Erich Kamperschroer, Hamminkeln (DE); Dieter Kehren, Dinslaken (DE); Günter Kleindl, Ybbs/Donau (AT); Christoph Lenfort, Bocholt (DE); Andreas Müller, Rees (DE); Marco van de Logt, Goch (DE)

(73) Assignee: Gigaset Communications GmbH, Munich (DE)

( * ) Notice: Subject to any disclaimer, the term of this patent is extended or adjusted under 35 U.S.C. 154(b) by 485 days.

(21) Appl. No.: 11/885,271

(22) PCT Filed: Dec. 19, 2006

(86) PCT No.: PCT/EP2006/069946
§ 371 (c)(1),
(2), (4) Date: Aug. 29, 2007

(87) PCT Pub. No.: WO2007/071694
PCT Pub. Date: Jun. 28, 2007

(65) Prior Publication Data
US 2008/0144667 A1 Jun. 19, 2008

(30) Foreign Application Priority Data
Dec. 19, 2005 (EP) .................. 05027784

(51) Int. Cl.
*H04J 3/16* (2006.01)
(52) U.S. Cl. .............. 370/437; 370/329; 370/461
(58) Field of Classification Search ........... 370/329, 370/437, 461
See application file for complete search history.

(56) References Cited

U.S. PATENT DOCUMENTS 5,598,407 A * 1/1997 Bud et al. ............ 370/330

(Continued)

FOREIGN PATENT DOCUMENTS

EP 0 399 612 11/1990

(Continued)

OTHER PUBLICATIONS

Paradells, J., Calveras, A., Carpintero, C., Casares, V., "DECT Multibearer Channels", Jun. 10, 1994, Vehicular Technology Conference, 1994 IEEE 44th, pp. 696-700.*

(Continued)

*Primary Examiner*—Jason E Mattis
(74) *Attorney, Agent, or Firm*—Staas & Halsey LLP

(57) ABSTRACT

During the transmission of subscriber-specific data, particularly via a transfer medium and according to a transmission principle based on time slot transmission with time slot separation, the transfer medium used by several subscribers can also be efficiently used when the data rates of the data transmitted in the transmission direction (SRI) and the reception direction (ERI) for at least one subscriber using the transmission are differently, i.e. asymmetrically distributed. To this end, the data to be transmitted for each subscriber are transmitted, as in the case of a symmetric data distribution, in at least two time slots (ZS) per a periodically returning time frame (ZR, ZR1, ZR6) and corresponding to the asymmetrical distribution of the ratio of a number of transmission data packets (SDP) to reception data packets (EDP) in a plurality n half time frame of the time frame (ZR, ZR1 ZR6) with n being greater or equal to 2 or ∈ N.

10 Claims, 3 Drawing Sheets

U.S. PATENT DOCUMENTS

| | | | | |
|---|---|---|---|---|
| 6,411,611 | B1 * | 6/2002 | van der Tuijn | 370/337 |
| RE40,715 | E * | 5/2009 | Izumi | 370/442 |
| 2002/0164989 | A1 * | 11/2002 | Skillermark et al. | 455/446 |
| 2003/0054829 | A1 * | 3/2003 | Moisio | 455/452 |
| 2005/0048985 | A1 * | 3/2005 | Haartsen | 455/453 |
| 2005/0243745 | A1 * | 11/2005 | Stanwood et al. | 370/280 |

FOREIGN PATENT DOCUMENTS

| | | |
|---|---|---|
| EP | 0 827 295 | 3/1998 |
| EP | 0 935 353 | 8/1999 |
| GB | 2 321 160 | 7/1998 |

OTHER PUBLICATIONS

Kobayashi Y et al.: "Asymmetric Radio Resource Assignment Scheme For Connection-Less Services in CDMA/Shared-TDD Cellular Packet Communications", IEICE Transactions On Fundaments of Electronics, Communications and Computer Sciences, Engineering Sciences Society, Tokyo, JP, Bd. E88-A, Nr. 7, Jul. 2005, pp. 1903-1911, XP001231969, ISSN: 0916-8508.

Fa. Hoeft & Wessel: "White Paper", DECT-Conference, Feb. 11-12, 2003.

Walke B.: "Mobilfunknetze und ihre Protokolle", Verlag B.G. Teubner Stuttgart 1998, Band 2, Kapitel 5, Seiten 107 bis 216, insb. Kapitel 5.4.1.2.

* cited by examiner

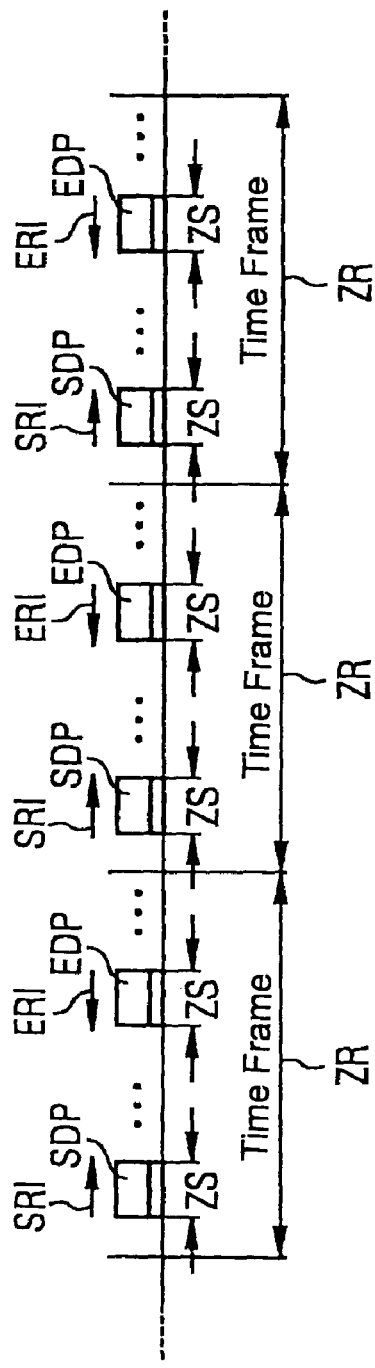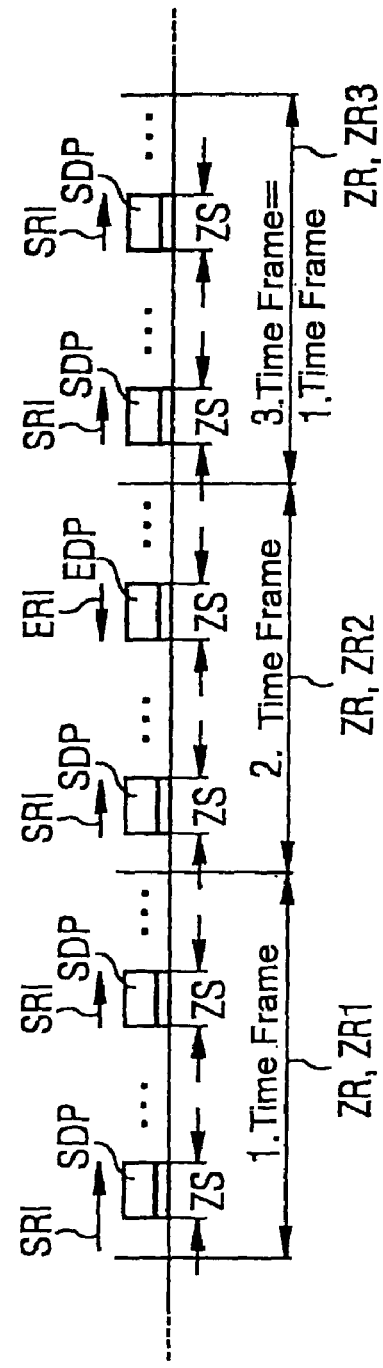

METHOD FOR TRANSMITTING SUBSCRIBER-SPECIFIC DATA

CROSS REFERENCES TO RELATED APPLICATIONS

This application is based on and hereby claims priority to PCT Application No. PCT/EP2006/069946 filed on Dec. 19, 2006 and European Application No. EP05027784 filed on Dec. 19, 2005, the contents of which are hereby incorporated by reference.

BACKGROUND OF THE INVENTION

The invention relates to a method for transmission subscriber-specific data by way of a transmission medium according to a transmission principle based on time slot transmission with time slot separation, a method for transmitting subscriber-specific data, each having their application in particular in TDMA/TDD-based (Time Division Multiple Access/Time Division Duplex) telecommunication systems.

In a DECT-based (Digital Enhanced Cordless Telecommunication) telecommunication system subscriber-specific data is transmitted by way of a DECT radio interface. This transmission takes place according to the DECT standard (ETSI EN 300 175-1 . . . 8, V1.9.1, 09/2005) in time slots with time slot separation—in other words according to the TDMA and TDD transmission principle. According to the DECT standard the time slots can also have different formats (different types of time slots). Thus there are half-slot time slots each with a payload data field of 80 bits, full-slot time slots each with a payload data field of 320 bits or double-slot time slots each with a payload data field of 800 bits.

For the transmission of subscriber-specific data by way of the DECT radio interface it is also desirable in some circumstances to use an SB-ADPCM-based (Sub-Band Adaptive Differential Pulse Code Modulation) broadband voice transmission with a payload data rate of 64 kbps (kbits per second) according to the ITU-T G.722 standard instead of the ADPCM-based (Adaptive Differential Pulse Code Modulation) narrow band voice transmission with a payload data rate of 32 kbps according to the ITU-T G.726 standard generally used until now according to the DECT standard, thereby keeping the number of voice concentrations that can be controlled simultaneously by a DECT base station by way of the DECT radio interface constant despite the increased data rate.

In order to set up a 64 kbps voice data connection between two DECT devices in the DECT system, it is possible to use the above-mentioned double-slot time slot according to the current DECT standard. When low-cost slow-hopping radio parts were used for the respective DECT devices, three or even four (depending on the realization) DECT time slots were always required. This means that only four or three simultaneous connections can be set up, representing a significant loss compared with the maximum six connections with the 32 kbps voice data connection.

Alternatively a plurality of full-slot time slots can be combined, which however also reduces the number of simultaneous connections. The problem could also be resolved with greater expenditure using fast-hopping radio parts instead of the slow-hopping radio parts or with better quality modulation methods.

A further option for realizing the 64 kbps voice data connection in the DECT system is based on a known proposal in the form of a white paper by the company Höft & Wessel at the DECT conference, Feb. 11/12, 2003. The proposal involves shortening the double-slot time slot to a fixed length (so-called long slot). The full-slot time slot can also be shortened to a fixed length according to the shortening proposal from Höft & Wessel (so-called short slot).

When subscriber-specific data is transmitted in a DECT-based telecommunication system a fixed time frame is also used, which is divided into a plurality of time slots. If the aim in the DECT system is now to transmit data simultaneously in a combined mode by way of both symmetrical connections and asymmetrical connections, with transmission taking place in a forward and backward direction (transmit and receive direction) at the same data rate in the case of a symmetrical connection, while in the case of an asymmetrical connection the data rates of the two transmission directions are different, a time slot pair is used for the symmetrical connection and a different number of for example at least four time slots of the same type is used for the two transmission directions for the asymmetrical connection.

In the case of the symmetrical connection the transmission times for the two transmission directions are offset by precisely half the length of a time frame. In the case of the asymmetrical connection three time slots of the four time slots are used for one direction and one time slot for the counter direction. The number of time slots is always even and the time slots are preferably disposed in pairs offset by half the length of a time frame in the frame, so that the asymmetrical connections can be combined as efficiently as possible with symmetrical connections.

WLAN-based (Wireless Local Area Network) telecommunication systems according to the IEEE 802.11 standard use a different transmission principle, which is however much less efficient than that of the DECT system.

SUMMARY OF THE INVENTION

One possible object is to utilize the transmission medium that can be used by a plurality of subscribers efficiently for the transmission of subscriber-specific data by way of a transmission medium according to a transmission principle based on time slot transmission with time slot separation, even if the data rates of the data to be transmitted in the transmit and receive directions are different for at least one subscriber using the transmission medium.

The inventors propose transmitting subscriber-specific data, distributed asymmetrically in the transmit and receive directions, by way of a transmission medium according to a transmission principle based on time slot transmission with time slot separation for every subscriber as in the case of a symmetrical distribution of data in at least two time slots per periodically recurring time frame and according to the asymmetrical distribution by the ratio of a plurality of transmit data packets to receive data packets in a plurality "n" of half time frames of time frames where "n≦2 and n∈N".

This manner of transmitting asymmetrically distributed data in systems with a transmission principle based on time slot transmission with time slot separation allows more efficient data transmission compared with former systems.

EXAMPLE 1

If a DECT-based telecommunication system [see: (1) ESTI EN 300 175-1 . . . 8, V1.9.1, 09/2005; (2) book published by B. G. Teubner Stuttgart 1998 under "Information technology": B. Walke "Mobilfunknetze und ihre Protokolle" (Mobile radio networks and their protocols), vol. 2, chapter 5, pages 107 to 216; in particular chapter 5.4.1.2] an asymmetrical transmission is used with four full-slot time slots (3 full-slot time slots in one direction and 1 full-slot time slot in the counter direction) and binary modulation, this gives an overall payload data rate of 128 kbit/s (96 kbit/s+32 kbit/s).

If in contrast the proposed method is used, where n=2, it is then possible to use two double-slot time slots, since a specific slot is not required for the back channel. Therefore for the same percentage occupation of the frame the overall payload data rate rises to 160 kbits/s, which corresponds to an increase in the data rate of 25%. Allocation of the data rate to the two directions takes place by the pulse duty factor, for example 120 kbit/s+40 kbit/s.

EXAMPLE 2

If in the DECT system from example 1 an asymmetrical transmission is now used with four half-slot time slots (3 half-slot time slots in one direction and 1 half-slot time slot in the counter direction) and binary modulation, this gives an overall payload data rate of 32 kbit/s (24 kbit/s+8 kbit/s).

If in contrast the proposed method is again used, where n=2, it is then possible to use two full-slot time slots, since a specific slot is not required for the back channel. Therefore for the same percentage occupation of the frame the overall payload data rate rises to 64 kbit/s, which corresponds to an increase in the data rate of 100%. Allocation of the data rate to the two directions takes place by the pulse duty factor, for example 48 kbit/s+16 kbit/s.

Further Advantages

Since with the proposed method even with asymmetrical connections only time slots pairs are used, it is possible to utilize the transmission medium in an optimum manner even with a combined mode of asymmetrical and symmetrical connections, without unusable time gaps occurring.

It is possible but not necessary always to use the same time slot type for a connection.

The ratio of transmit data rate to receive data rate can be set in a relatively flexible manner.

Note

Asymmetry over a plurality of frames in any case also means an increase in the time delay for the back channel with a low data rate. The selection of the packet format (half-, full-, double-slot) and the ratio of forward to back channel (3:1, 5:1, 3:2, etc.) is influenced not only by the required data rate but also by the maximum acceptable delay time.

In order however also to create the possibility according to a further proposed concept, wherein the data rate resulting further to the subscriber-specific data transmission can be set in a much more flexible manner than previously and low-cost slow-hopping radio parts can also be used, it is proposed—because almost all known slow-hopping radio parts currently require less than 160 μs build-up time—that the former double-slot time slot should be shortened to such an extent that a free zone of around 180 μs results together with the standard 56 bit guard period and this can then be used as build-up time for the time slot following immediately after. A reduction in the B-field from 800 bits (standard double-slot time slot) to 640 bits gives a free zone of 56+160=216 bits (187 μs). This allows up to six simultaneous broadband voice connections to be realized.

For a secured data transmission, in a further step the 640 bit B-field is extended by a 32 bit CRC, so that 672 bits are now transmitted in the B-field. The free zone is then reduced to 56+128=184 bits (160 μs).

In order also not to be tied to just these two packet formats (640 bit and 672 bit B-field) with the proposal, but also to incorporate further formats and data rates expediently in the DECT standard, it is also proposed that a new packet format of variable length be defined. This also allows many further B-field lengths to be derived in a simple manner for special requirements.

It is now possible to upgrade from the narrowband G.726 codec (32 kbps) to the broadband G.722 codec (64 kbps) with an unchanged number of simultaneous connections even with low-cost slow-hopping radio parts. Expensive fast-hopping radio parts are no longer necessary.

The variable length packet format allows the resulting data rate to be adjusted much more finely according to the requirements of the application than was previously possible. This results in better utilization of the radio transmission link. With high data rates there is also no need for the overhead for guard times and synchronization occurring with the multiple time slot method, thereby allowing a further improvement in efficiency.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows data transmitted for a subscriber in two time slots per periodically recurring time frame with a symmetrical distribution of transmit data packets to receive data packets in a ratio of 1:1, FIG. 2 shows data transmitted for a subscriber in two time slots per periodically recurring time frame with an asymmetrical distribution of transmit data packets to receive data packets in a ratio of 3:1.

DETAILED DESCRIPTION OF THE PREFERRED EMBODIMENT

Figure 3:
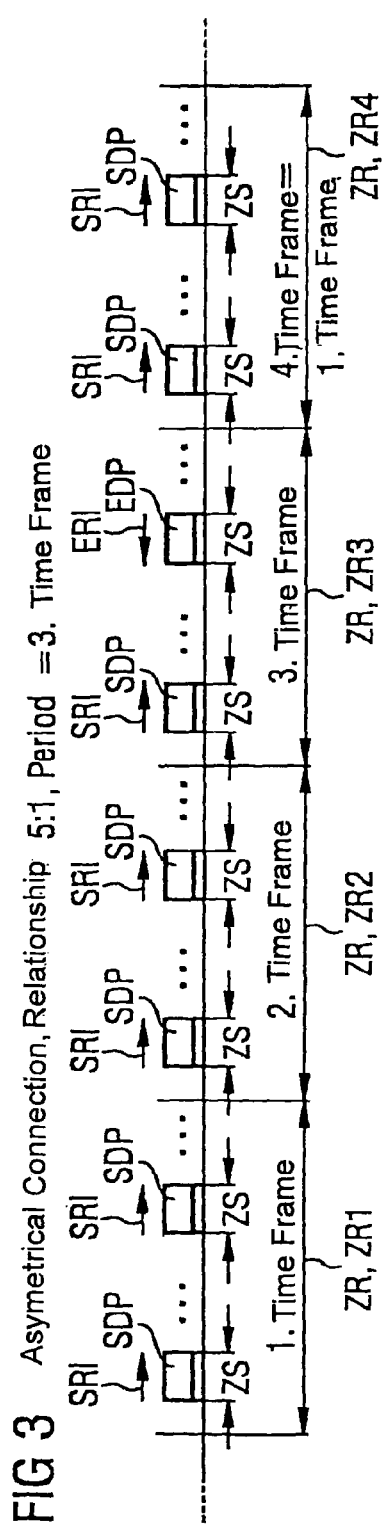
FIG. 3 shows data transmitted for a subscriber in two time slots perperiodically recurring time frame with an asymmetrical distribution of transmit data packets to receive data packets in a ratio of 5:1.

Reference will now be made in detail to the preferred embodiments of the present invention, examples of which are illustrated in the accompanying drawings, wherein like reference numerals refer to like elements throughout.

FIG. 1 shows now data is transmitted by way of a transmission medium, for example air, according to a transmission principle based on time slot transmission with time slot separation, for example the TDMA/TDD principle according to the DECT standard, for a subscriber, said subscriber having to share the transmission medium in some instances with further subscribers, in the case of a symmetrical connection in two time slots ZS with time slot separation, e.g. one downlink time slot and one uplink time slot, per periodically recurring time frame ZR, said data being distributed symmetrically in the transmit direction SRI as transmit data packets SDP and in the receive direction ERI as receive data packets EDP over the time frames ZR shown. Symmetrical distribution here means that the number of transmit data packets SDP and receive data packets EDP is the same for every time frame ZR, the data packets thus being distributed to the time frames ZR in a ratio of 1:1.

The half-slot time slots, full-slot time slots and/or double-slot time slots defined in the DECT standard can be used as time slots ZS. The time slots ZS are preferably assigned in pairs to the time frame ZR, with the interval of the time slot pair being the length of half a time frame. It is however also possible to assign more than two time slots to the time frame.

FIG. 2 shows how data is transmitted by way of the transmission medium, for example air, according to the transmission principle based on time slot transmission with time slot separation, for example the TDMA/TDD principle according to the DECT standard, for a subscriber, said subscriber having to share the transmission medium in some instances with further subscribers, in the case of an asymmetrical connection in two time slots ZS with time slot separation per periodically recurring time frame ZR, said data being distributed in the transmit direction SRI as transmit data packets SDP and in the receive direction ERI as receive data packets EDP over the time frames ZR shown.

In a first time frame ZR1 two transmit data packets SDP are transmitted in the two time slots ZS. The two time slots ZS are therefore for example either both downlink time slots or both uplink time slots. In a subsequent second time frame ZR2 a transmit data packet SDP is transmitted in one time slot ZS and a receive data packet EDP is transmitted in the other time slots ZS. The two time slots ZS are therefore a downlink time slot and an uplink time slot for example. In a subsequent third time frame ZR3 two transmit data packets SDP are transmitted, as in the first time frame ZR1, giving a periodicity of two time frames. In these two time frames the transmit data packets SDP and receive data packets EDP are distributed in a ratio of 3:1, in other words three transmit data packets SDP to one receive data packet EDP.

For the distribution of the transmit data packets SDP and receive data packets EDP a plurality "n" of half time frames of the time frames ZR1, ZR2 is used to the extent that the delay time required as a result has no disruptive influence for data transmission.

The half-slot time slots, full-slot time slots and/or double-slot time slots defined in the DECT standard can also be used as time slots ZS. The time slots ZS are preferably again assigned in pairs to the time frame ZR, with the interval for the time slot pair being the length of half a time frame.

FIG. 3 shows how data is transmitted by way of the same transmission medium as in FIG. 2, according to the transmission principle based on time slot transmission with time slot separation, for example the TDMA/TDD principle according to the DECT standard, for a subscriber, said subscriber again having to share the transmission medium in some instances with further subscribers, in the case of an asymmetrical connection in two time slots ZS with time slot separation per periodically recurring time frame ZR, said data being distributed in the transmit direction SRI as transmit data packets SDP and in the receive direction ERI as receive data packets EDP over the time frames ZR shown.

In two successive time frames ZR, a first time frame ZR1 and a second time frame ZR2, a transmit data packet SDP is transmitted in both time slots ZS respectively. The two time slots ZS are therefore either both downlink time slots or both uplink time slots respectively for example. In a subsequent third time frame ZR3 a transmit data packet SDP is transmitted in one time slot ZS and a receive data packet EDP is transmitted in the other time slot ZS. The two time slots ZS are therefore a downlink time slot and an uplink time slot for example. In a subsequent fourth time frame ZR4 two transmit data packets SDP are transmitted, as in the first time frame ZR1, giving a periodicity of three time frames. In these three time frames the transmit data packets SDP and receive data packets EDP are distributed in a ratio of 5:1, in other words there are now five transmit data packets SDP to a receive data packet EDP.

For the distribution of the transmit data packets SDP and receive data packets EDP a plurality "n" of half time frames of the time frames ZR1, ZR2, ZR3 is again used to the extent that the delay time required as a result has no disruptive influence for data transmission.

The half-slot time slots, full-slot time slots and/or double-slot time slots defined in the DECT standard can again also be used as time slots ZS. The time slots ZS are preferably again assigned again in pairs to the time frame ZR, with the interval for the time slot pair being the length of half a time frame.

Figure 4:
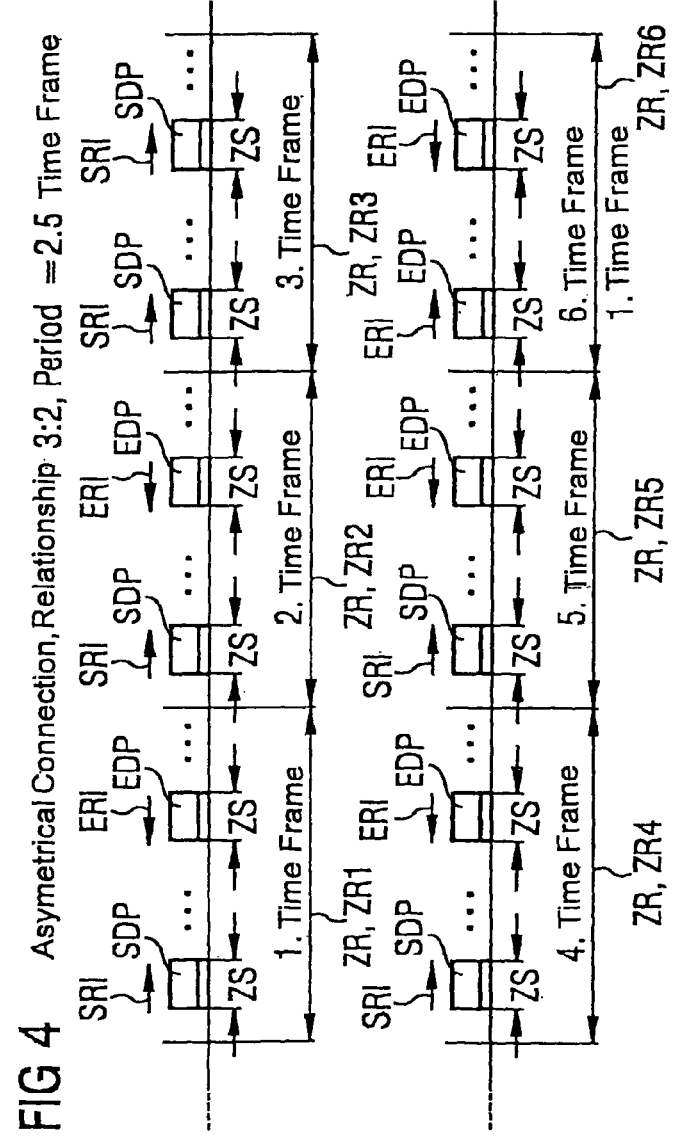
FIG. 4 shows data transmitted for a subscriber in two time slots per periodically recurring time frame with an asymmetrical distribution of transmit data packets to receive data packets in a ratio of 3:2.

FIG. 4 shows how data is transmitted by way of the same transmission medium as in FIGS. 2 and 3, according to the transmission principle based on time slot transmission with time slot separation, for example the TDMA/TDD principle according to the DECT standard, for a subscriber, said subscriber again having to share the transmission medium in some instances with further subscribers, in the case of an asymmetrical connection in two time slots ZS with time slot separation per periodically recurring time frame ZR, said data being distributed in the transmit direction SRI as transmit data packets SDP and in the receive direction ERI as receive data packets EDP over the time frames ZR shown.

In two successive time frames ZR, a first time frame ZR1 and a second time frame ZR2, a transmit data packet SDP is transmitted in one time slot ZS respectively and a receive data packet EDP is transmitted in the other respective time slot ZS. The two time slots ZS are therefore a downlink time slot and an uplink time slot respectively for example. In a subsequent third time frame ZR3, because the assignment of time slots ZS to a time frame is preferably always effected in pairs and the asymmetrical connection is to be implemented with the fewest possible changes in respect of the symmetrical connection in FIG. 1, a transmit data packet SDP is transmitted in both time slots ZS. The two time slots ZS are therefore either both downlink time slots or both uplink time slots for example. In two further successive time frames ZR, a fourth time frame ZR4 and a fifth time frame ZR5, a transmit data packet SDP is again transmitted in one time slot ZS respectively and a receive data packet EDP is transmitted in the other respective time slot ZS. The two time slots ZS are again therefore a downlink time slot and an uplink time slot respectively for example. In a subsequent sixth time frame ZR6, a transmit data packet SDP is transmitted in a time slot ZS and a receive data packet EDP is transmitted in the other time slot ZS, as in the first time frame ZR1, giving a periodicity of 5:2=2.5 time frames. In these 2.5 time frames the transmit data packets SDP and receive data packets EDP are distributed in a ratio of 3:2, in other words there are now three (six) transmit data packets SDP to two (four) receive data packets EDP.

For the distribution of the transmit data packets SDP and receive data packets EDP a plurality "n" of half time frames of the time frames ZR1, ZR2, ZR3, ZR4, ZR5 is again used to the extent that the delay time required as a result has no disruptive influence for data transmission.

The half-slot time slots, full-slot time slots and/or double-slot time slots defined in the DECT standard can again also be used as time slots ZS. The time slots ZS are preferably again assigned again in pairs to the time frame ZR, with the interval for the time slot pair being the length of half a time frame.

Figure 5:
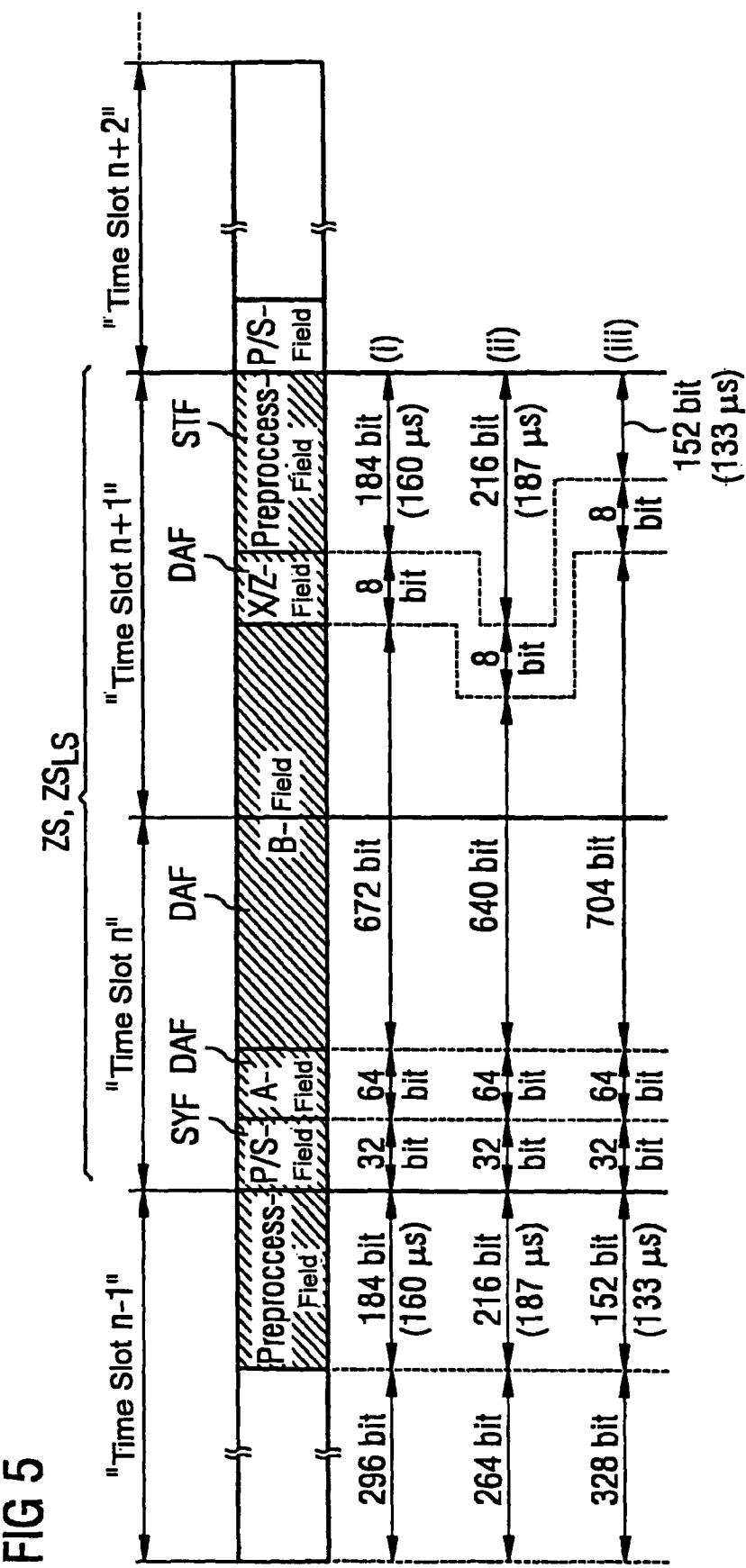
FIG. 5 shows a time slot structure with which the data rate resulting further to the subscriber-specific data transmission can be set in a much more flexible manner than previously.

FIG. 5 shows how in principle a shortened double-slot time slot, referred to as a long-slot time slot $ZS_{LS}$, which dates back to a proposal from Höft & Wessel at the DECT conference, Feb. 11/12, 2003 and has the bit and time data for (ii), is generated from two successive full-slot time slots—for example the time slot n and the time slot n+1 according to the DECT standard, the time slot structure of said time slot having a synchronization field SYF, a data field DAF and a control field STF and being able to be modified in such a manner that the data field DAF is shortened compared with an unshortened double-slot time slot of the DECT standard but is variable for this purpose and the control field STF is at least so long that a carrier signal frequency change can be carried out regardless of how quickly a carrier signal frequency for the transmitted data can be changed.

While according to the DECT standard the synchronization field SYF includes the P/S field (preamble/synchronization) and the control field STF includes a preprocess field, which is formed from the guard period, the data field DAF contains the A-field, the B-field and the X/Z field. The size of the control field STF is hereby dimensioned in such a manner that a carrier signal frequency change can also be carried out reliably, regardless of how quickly a carrier signal frequency for the transmitted data can be changed.

The variability compared with the Höft & Wessel proposal is indicated in FIG. 5 by the bit and time data for (i) and (iii). In both instances the B-field of the data field DAF is enlarged at the cost of the control field STF. In instance (i) from 640 bits to 672 bits and in instance (iii) from 640 bits to 704 bits.

The long-slot time slot $ZS_{LS}$ with the described time slot structure, as shown in FIG. 5, can also be used as the time slot ZS in FIGS. 1 to 4.

The above statements relating to the double-slot time slot shortened from a double-slot time slot and referred to as a long-slot time slot $ZS_{LS}$ also retain their validity (except for the bit and time data) for a full-slot time slot shortened from a full-slot time slot and referred to as a short slot.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of the A, B and C may be used, contrary to the holding in Superguide v. DIRECTV, 69 USPQ2d 1865 (Fed. Cir. 2004).

The invention claimed is:

1. A method for transmitting subscriber-specific data by a communication system in time slots with time slot separation, comprising:
   combining the time slots for transmission into a periodically recurring time frame such each subscriber having data transmitted in a time frame has at least two time slots assigned to the time frame;
   asymmetrically transmitting data for each subscriber in a transmit direction and a receive direction with a distribution ratio determined according to a ratio of transmit data packets to receive data packets; and
   transmitting data for the subscriber in a plurality "n" of half time frames of the time frames, where n≧2 and n∈N,
   wherein the time slots are selected from the group consisting of half-slot time slots, full-slot time slots and double-slot time slots,
   wherein a shortened full-slot time slot referred to as a short slot is used for full-slot time slot transmission,
   a shortened double-slot time slot referred to as a long-slot time slot is used for double-slot time slot transmission,
   each shortened full slot time slot and each shortened double-slot time slot contains a synchronization field, a data field and a control field,
   the data field in the shortened full-slot time slot is shortened compared with an unshortened full-slot time slot,
   the data field in a shortened double-slot time slot is shortened compared to an unshortened double-slot time slot,
   the size of the data field is variable in the shortened full slot time slot and the shortened double-slot time slot, and
   the control field is at least as long as required for a carrier signal frequency change to be carried out regardless of how quickly a carrier signal frequency for transmitted data can be changed.

2. The method for transmitting subscriber-specific data as claimed in claim 1, wherein
   the plurality "n" of half time frames of the time frames used for distribution of transmit data packets and receive data packets is proportional to a delay time, and
   the plurality "n" is limited so that the delay time has no disruptive influence on data transmission.

3. The method for transmitting subscriber-specific data as claimed in claim 1, wherein air is used as a transmission medium.

4. The method for transmitting subscriber-specific data as claimed in claim 3, wherein a DECT radio interface is used for wireless data transmission.

5. The method for transmitting subscriber-specific data as claimed in claim 4, wherein the time slots are assigned to the time frame in pairs, and
   the distance from the beginning of the first time slot of the time slot pair to the beginning of a second time slot of the time slot pair is equal to the length of half a time frame.

6. The method for transmitting subscriber-specific data as claimed in claim 1, wherein
   152 bits are allocated to the half-slot time slot in the data field,
   264 bits are allocated to the shortened full-slot time slot in the data field,
   392 bits are allocated to the full-slot time slot in the data field,
   744 bits are allocated to the shortened double-slot time slot in the data field, and
   872 bits are allocated to the double-slot time slot in the data field.

7. The method for transmitting subscriber-specific data as claimed in claim 1, wherein
   the plurality "n" of half time frames of the time frames used for distribution of transmit data packets and receive data packets is proportional to a delay time, and
   the plurality "n" is limited so that the delay time has no disruptive influence on data transmission.

8. The method for transmitting subscriber-specific data as claimed in claim 7, wherein a DECT radio interface is used for wireless data transmission.

9. The method for transmitting subscriber-specific data as claimed in claim 8, wherein the time slots are assigned to the time frame in pairs, with the interval for the time slot pair being the length of half a time frame.

10. The method for transmitting subscriber-specific data as claimed in claim 9, wherein
   152 bits are allocated to the half-slot time slot in the data field,
   264 bits are allocated to the shortened full-slot time slot in the data field,
   392 bits are allocated to the full-slot time slot in the data field,
   744 bits are allocated to the shortened double-slot time slot in the data field, and
   872 bits are allocated to the double-slot time slot in the data field.

* * * * *

UNITED STATES PATENT AND TRADEMARK OFFICE
CERTIFICATE OF CORRECTION

PATENT NO. : 7,848,344 B2
APPLICATION NO. : 11/885271
DATED : December 7, 2010
INVENTOR(S) : Stefan Huelder et al.

It is certified that error appears in the above-identified patent and that said Letters Patent is hereby corrected as shown below:

Column 8, Line 11 in Claim 2, delete "in" and insert -- is --, therefor.

Column 8, Line 44 in Claim 7, delete "transmission." and insert -- transmission, wherein air is used as a transmission medium. --, therefor.

Signed and Sealed this
Twenty-second Day of March, 2011

David J. Kappos
*Director of the United States Patent and Trademark Office*